United States Patent Office

3,758,271
Patented Sept. 11, 1973

3,758,271
COMPOSITIONS AND PROCESSES
Robert Lauren Tichenor, Waynesboro, Va., assignor to
E. I. du Pont de Nemours and Company, Wilmington,
Del.
No Drawing. Filed Sept. 14, 1971, Ser. No. 180,448
Int. Cl. D06p 5/06
U.S. Cl. 8—172
6 Claims

ABSTRACT OF THE DISCLOSURE

An anionically-modified acrylic fiber coated with a small amount of a selected poly(secondary amine) or poly(tertiary amine) such as poly(diethylaminoethyl methacrylate), or protonated salt thereof, such as protonated poly(diethylaminoethyl methacrylate) acetate. The polyamine or protonated salt thereof acts as a dye retarder along the surface of the acrylic fiber to promote efficient dye use and uniformity of dye levels.

BACKGROUND (1) Field of the invention

This invention relates to fibers coated with a dye retarder, and more specifically, to cationic-dyeable acrylic fibers coated with poly(secondary- or tertiary-amine) dye retarders and a dyeing process using such retarders.

(2) Description of the prior art

The dyeability of acrylic polymers with cationic dyes may be improved by incorporating into the polymer recurring units which contain side chains having an anionic charge, i.e., dye sites, as is described in U.S. Patents 2,837,500 and 2,837,501. Such polymers are sometimes called anionically-modified acrylic polymers and will be so referred to herein. While such polymers dye readily with cationic dyes that are attracted to the anionic dye site, there is a tendency for the dyeing to be rapid and uneven, resulting in undesirable aesthetic qualities. Dye retarders are therefore used to reduce the speed of the reaction between the cationic dye and the anionic dye sites in the fiber. One form of retarder is anionic and competes with the fiber for the dye, while another form of retarder is cationic and competes with the dye for the fiber. Examples of cationic dye retarders used heretofore with anionically-modified acrylic fibers are the quaternary ammonium compounds described in U.S. Patents 2,963,-339 and 2,986,444 and the quaternary ammonium ether polymers described in U.S. Patent 3,355,243 and British Patents 1,107,819 and 898,311.

Cationic dye retarders are believed to remain to some extent in association with the fiber dye sites, which adversely affects the degree or depth of dye saturation obtainable in the fiber. Anionic retarders to some extent remain in association with the dye, thus leading to loss of dye by failure of the dye to exhaust from the bath onto the fiber.

The present invention provides an anionically-modified acrylic fiber having a surface coating of a selected dye retarder, which due to its structure appears to function on the surface of the fiber rather than in the interior of the fiber.

SUMMARY OF THE INVENTION

This invention provides an anionically-modified acrylic fiber having on the surface thereof between about 0.01 and 2 percent by weight, based on the weight of fiber, of at least one polyamine or a protonated salt thereof, said polyamine having at least 70% of its recurring units selected from the class consisting of:

(a) 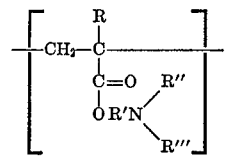

and
(b) 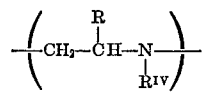

wherein R, individually, is hydrogen or methyl, R' is alkylene of 1–4 carbon atoms, R" and R'", individually, are methyl or ethyl, and $R^{IV}$ is methyl, hydrogen or a mixture of hydrogen and units of

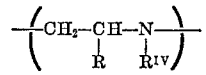

and wherein said polyamine has an inherent viscosity of between 0.05 and 2.0 in acetone at 25° C.

The polyamine, which as seen from the formulas is a poly(secondary amine) or poly(tertiary amine), or its protonated salt form, can be coated on the fiber prior to dyeing the fiber, or can be added to the dye bath and applied to the fiber simultaneously with, or prior to addition of, the dye. These processes also form a part of this invention.

DESCRIPTION OF THE INVENTION

The anionically-modified acrylic fibers useful herein include both staple fiber and continuous filament of denier between about 1 and 20. The term "acrylic fiber" as used herein refers to a fiber made from a synthetic polymer containing at least 85% by weight units derived from acrylonitrile. The term "anionically-modified" is defined herein as meaning that for every kilogram of acrylic polymer there is between 25 and 1000 milliequivalents of a copolymerizable monomer bearing an anionic function. The milliequivalents of such a monomer per kilogram of polymer is the number of milliliters of 1 N sodium hydroxide that are required to neutralize the acid function (e.g., sulfonate and sulfate substituents) in one kilogram of polymer if all the substituents were in the free acid form of a copolymerizable monomer which bears an anionic function. Redox catalysis, if employed, adds 20 to 50 meq./kg. anionic modification. Examples of such copoylmerizable monomers include styrenesulfonic acid, allylsulfonic acid, methallylsulfonic acid, and their metal, ammonium or lower alkyl substituted amine salts. In addition to the monomer which provides anionic function, the acrylic polymer may contain additional comonomers (up to total for both of about 15%) such as discussed in U.S. Patent 2,837,501. These include monoethylenically unsaturated monomers such as methyl acrylate, methyl methacrylate, vinyl acetate, styrene, methacrylonitrile, vinyl chloride, vinylidene chloride, methyl vinyl ketone, the vinyl pyridines and the like. Preferred for the monomers providing the anionic function is styrene-sulfonic acid and its salts; while preferred for the additional monomers, if present, are methyl acrylate, vinyl acetate or styrene.

The acrylic fiber may be a bicomponnet or monocomponent fiber, and preferably is made from a copolymer of acrylonitrile that has been anionically modified as described above. The fiber may contain typical additives such as light-scattering pigments, antistatic agents and the like, so long as they do not interfere with the function of the dye retarder during the dyeing process.

The dye retarder used in this invention is a polyamine or protonated salt thereof whose formula has been set forth above. Representative of the polyamines are poly-(diethylaminoethyl methacrylate), i.e., poly DEAM, poly(diethylaminomethyl methacrylate), poly(dimethylaminoethyl methacrylate), poly(dimethylaminomethyl methacrylate), and methylated poly(ethylenimine). Some poly(ethylenimine)s comprise a mixture of straight-chains and branched chains. Both are included in the term poly-(ethylenimine) as used herein. These polyamines may be coated onto the acrylic fiber from solution as such, or may be coated on as their acid (protonated) salts. Alternatively, the amines may be applied in the dye bath in their protonated form. (This is easily accomplished since cationic dyeing is normally carried out in an acidic medium.) When protonated, the anion of the resulting salt can be any univalent or multivalent anion that does not interfere with the dyeing procedures. Preferably, the anion will be acetate, chloride, sulfate or phosphate, and most preferably acetate or chloride.

The inherent viscosity of the polyamine dye retarder employed should be between about 0.05 and 2.0, preferably between 0.07 and 0.2, when determined by dissolving 0.5 g. of the polyamine in 100 ml. acetone which contains 0.25±.02% water and measuring the viscosity at 25° C. using art-known procedures.

The dye retarder may be applied to the fiber prior to dyeing from any solution capable of wetting the fiber. Preferably, the retarder is applied in its protonated salt form from a water solution having a pH of between 3 and 5. The concentration of the amine or its protonated salt in solution is not critical so long as the treatment of the fiber results in a treated fiber containing between about 0.01 and 2%, preferably 0.1 and 0.25%, by weight of the retarder based on weight of the fiber. Ordinarily, the fibers are simply passed through the acidic solution in a continuous manner by passing them through a series of connected tanks containing the solution until the desired amount of pick-up is attained. Thus, the concentration of the solution may range from 0.01% in solvent-extraction liquor to 2% or more in a solution to be padded onto a bundle of fibers by roll. Temperatures of application are not critical and may range from 25° C. to near the boiling of the solution, under atmospheric pressure. Higher or lower pressures may be used, but no advantage is gained therefrom. The fiber need not be pre-dried.

Alternatively, the dye retarder may be applied in its protonated salt form by adding it to the cationic dye bath. The pH of the dye bath should be between about 4 and 5 for good effectiveness. Conventional bath-to-fiber ratios may be used, e.g., 30/1 to 50/1 for fabric dyeing and up to 100/1 for skein or top dyeing based on weight of fiber.

The polymeric retarders of this invention may not have adequate water solubility in the free amine form for convenient application to fiber from an aqueous solution. A solution of the polyamine in acetone is a workable alternative in those cases where it is desirable to attain the polyamine/fiber combination. Of course, if the polyamine is applied to the fiber in its non-protonated form, it must be converted to the protonated form prior to dyeing. This can easily be accomplished by passing the coated fiber through a solution of acetic acid or by addition of the polyamine-coated fiber to the acidic dye bath prior to addition of the dye thereto.

The influence of the dye retarder on the properties of the anionically-modified acrylic fiber other than the property of cationic dyeability is minimal, probably due to the surface localization of the retarder on the fiber. Thus, effective retardation in dyeability of bicomponent acrylic fiber of the type which is self-crimpable on boiling and drying due to shrinkage differential between components can be accomplished without significant effect on crimp properties. On the other hand, the use of an art nonpolymeric, cationic retarder may affect the interior of the fiber and sharply reduce the wet-dry crimp reversibility of the bicomponent fiber.

The effectiveness of the dye retarders used in this invention is postulated to be due to the polymeric nature of the polyamine, the multiplicity of cationic sites along the length of the chain, and ease of coupling of the polyamine and available dye sites. Because of these facts, the polyamine remains on the fiber surface and does not penetrate to the fiber interior to any extent. Thus, the multiple cationic sites of the polyamine on the fiber surface that are not ionically bound with the anionic sites on the fiber act as a cationic barrier to repel and retard penetration of the dye into the interior of the fiber, and the steric hindrance created by the polyamine on the fiber surface aids such retardation. However, dye that has penetrated into the interior is free to attach to anionic sites in the interior to provide uniformity of dyeing. The retarders, being active only at the fiber surface, are effective at unusually low concentrations.

It is understood that the ester dye retardants, i.e., those having the recurring units

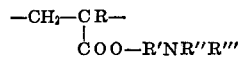

are subject to hydrolysis under conditions employed in commercial dyeing operations and thus up to about 30% of the recurring units of the polyamine may be hydrolyzed to the free acrylic or methacrylic acid unit

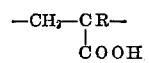

It has been found, and shown in Example 5 herein, that such in situ hydrolysis is not detrimental to the retardant properties of the polyamine, but that polymers containing large amounts of such free acid units do not retard well. Hence, the recurring units of the polyamine employed should be at least about 70% polyamine units.

EXAMPLE 1

Two lots of tow of filaments of three denier per filament are prepared at different times by a conventional process based on dry spinning of a solution of the polymer in dimethylformamide. The polymer is of a fiber-forming molecular weight (intrinsic viscosity 1.5) and is of 96% acrylonitrile units and about 4% sodium styrene sulfonate. Anionic modification amounts to about 250 meq./kg. The spun filaments are drawn to 450% of their spun length while extracting the residual solvent in hot water. Each lot of drawn filaments is dried and conventionally processed on a Turbo Stapler into drawn, high-shrinkage staple. sliver. Part of each lot of the sliver is relaxed, steamed, and blended with unrelaxed sliver from the same lot. Each of the blends is spun into yarn using commercial means and formed into high bulk yarns. Minor undefined differences in mechanical and heat history between the lots as typically experienced in commercial production results in differences in the rate of dye receptivity of the yarns from different lots when processed in commercial dyeing procedures. The yarns are circular knitted to provide knitted tubing junctions between yarns from the two lots for dyeability comparisons. The differences in shade of the yarns from the two lots are graded on an arithmetic scale in terms of shade differences, as determined by visual inspection (the experienced eye can detect a difference of one shade corresponding to a 3% difference in degree of color). Samples of the tubing are dyed in baths of the following composition; 50 parts of bath being used per part of tubing:

Basic dyeing:
  0.5% "Alkanol HCS" (wetting agent)
  15.0% Glauber's salt
  0.3% sodium acetate
  0.5% acetic acid (to pH in range of 4.5 to 5.0)
  1.0% dye (as described below)
  Retarder (as described below)

Disperse dyeing:
 2% tetrasodium pyrophosphate
 1% "Alkanol HCS" (wetting agent)
 0.5% dye (as described below)
 Retarder (as described below)

The bath is adjusted in 120° F. (49° C.), the fabric added, the bath raised in temperature at the rate of 1.0° F. (0.55° C.) per minute to 185° F. (85° C.) and held at that temperature for 60 minutes. The bath is raised rapidly to the boil and dyeing continued for 30 minutes more. The bath is then cooled slowly and the fabric removed and rinsed thoroughly in cool water.

Three retarders known in the art are used, (1) Du Pont Retarder LAN (trimethyl hexadecyl ammonium bromide), (2) Avitex JRM (trimethyl octadecyl ammonium chloride) and (3) Irgasol DM (an anionic retarder), along with one retarder within the scope of this invention. Two cationic dye formulations, CI Basic Red 18 and a green dye comprising equal parts mixture of CI Basic Red 18, CI Basic Yellow II and CI Basic Blue 4, and one disperse dye, CI Disperse Red 13, are used. The dyeings performed are set forth in Table 1.

TABLE 1

| Retarder/amount [1] | CI Basic Red 18 | Basic Green [2] | CI Disperse Red 13 |
|---|---|---|---|
| DuPont LAN/3%, 5%, 10% (experiments are conducted at all three concentrations). | X | X | |
| Avitex JRM/7% | X | | |
| Irgasol DM/4% | X | | |
| Poly(DEAM) acetate [3] 0.1–0.2% | X | X | X |
| Control (none) | | | X |

[1] Based on fiber.
[2] Equal parts of CI Basic Red 18, CI Basic Yellow II and CI Basic Blue 4.
[3] Poly(diethylaminoethyl methacrylate) as the acetate salt.

Dye junctions estimated to be greater than 5 shades apart occurred where a commercial retarder, or no retarder, is used. Use of 0.1% poly(DEAM)acetate based on weight of fiber in lieu of commercial retarder in the above procedure resulted in dye junction about one shade apart. The effectiveness in leveling of the retarder of this invention in comparison with art retarders is surprising in view of the smaller amount used.

When the poly(DEAM) as the acetate salt is applied by a 10-minute prescour in a solution thereof in water, to provide 0.2% by weight of the amine on the fiber, the retarder omitted from the dye bath, the 60-minute holding at 85° C. in the dye bath eliminated and the dye reduced to 0.2% in the foregoing procedure, the fabrics so dyed show no visible dye junctions.

In another experiment, 0.2% polydiisopropylaminoethyl methacrylate as the acetate salt is applied to the two lots of fiber as a 10-minute prescour in place of the poly(DEAM) acetate. Tubing knitted with alternating bands of yarns from the two lots of fiber exhibit dye junctions of more than 5 shades difference when dyed with 1% of the green dye of this example. The ineffectiveness of this polyamine is believed to be due to the fairly large isopropyl groups which stearically hinder association of the amine nitrogen with anionic dye sites.

EXAMPLE 2

Bicomponent acrylonitrile textile fiber is prepared as generally taught in U.S. Patent 3,038,237 to contain as one of two side-by-side components 85% polyacrylonitrile and 15% of a copolymer of 96% acrylonitrile and 4% sodium styrenesulfonate. The other component is 100% of the aforementioned copolymer. The overall anionic modification of this bicomponent fiber is about 160 meq./kg.

Carded samples of staple of these fibers are boiled successively in nonionic surfactant and soap solutions to remove all finish residues in preparation for the following experiments. The surfactant was a condensation product of long-chain alcohols and ethylene oxide having a molecular weight average of 1000–1200.

Retarder solutions are prepared to contain 0.1% of each polymeric dye retarder listed in Table II, 2.5% sodium chloride and 20% of the same surfactant, all based on weight of fiber to be added, except that all of the methacrylate polymers are added in an amount equal to the molar equivalent of 0.1% poly(DEAM).

In each experiment, 100 mg. of fiber is immersed for 10 minutes in 100 ml. of one of the boiling retarder solutions, then 5 mg. CI Basic Violet 16 dye is added (as a 0.05% solution) and boiling continued for an additional 10 minutes. The fiber is removed, rinsed and dried. The dye on fiber is determined by dissolving the fiber butyrolactone and analyzing spectrophotometrically with reference to a previously prepared curve relating Optical Density to dye concentration on fiber. Table 2 summarizes results.

TABLE 2

| Retarder: | * Dye on fiber |
|---|---|
| (1) None | 21.1 |
| (2) Poly(DEAM)acetate | 5.4 |
| (3) (2) quaternized with methyl iodide | 10.1 |
| (4) Poly(dimethylaminoethyl methacrylate) (added in the form of the acetate salt) | 3.8 |
| (5) (4) quaternized with methyl iodide | 11.6 |
| (6) Methylated poly(ethylenimine) | 2.1 |
| (7) (6) quaternized with methyl iodide | 8.8 |

*Millimols of dye per kg. of fiber.

From these experiments it is seen that the polyamine salts used in this invention are superior to their quaternized counterparts in retarding dye uptake.

EXAMPLE 3

Bicomponent acrylic fiber such as described in Example 2 is employed in a comparison of retarders at several concentrations to establish relative effectiveness in retarding of dyeing with CI Basic Violet 16.

Several lots of fiber are immersed in 900 times their weight of a boiling aqueous solution of either A. poly(DEAM) acetate, B. poly(ethylenimine)acetate, or C. Retarder LAN for 10 minutes, the solutions containing the amounts of reagents indicated in Table 3. As a further control, a specimen is run with no retarder. Each lot is then dyed with CI Basic Violet 16 essentially as described in Example 2 with no added retarder, except for the addition of 400 mg. Na₂SO₄ instead of 2.5 mg. NaCl, the bath being held at the boil for 10 minutes. Dye pick-up is measured spectrophotometrically as in Example 2.

TABLE 3

| Retarder type | Concentration, percent (based on fiber weight) | Dyeability (mm. dye/kg.) |
|---|---|---|
| None (standard) | | 29.9, 32.5 |
| A | 0.010 | 23.1 |
| | 0.033 | 18.6 |
| | 0.100 | 7.0 |
| | 0.300 | 5.7 |
| | 2.000 | 5.6 |
| | 10.000 | 5.5 |
| B | 0.010 | 16.0 |
| | 0.033 | 8.9 |
| | 0.100 | 9.2 |
| | 0.300 | 10.4 |
| | 2.000 | 8.8 |
| | 10.000 | 12.8 |
| C | 0.500 | 24.2 |
| | 2.000 | 13.2 |

From this experiment, it is seen that topical application of a polyamine acetate in accordance with this invention gives more uniform retardation than does a commercial cationic retarder.

EXAMPLE 4

Four commercial retarders of the cationic type are combined with acrylic fiber of Example 1 by addition of the amounts indicated in Table 4 (calculated on fiber) to the spinning solutions used to prepare the fiber. A further lot of extracted and drawn tow, without combined retarder, is passed at 180 yards/min. through a 1% aqueous solution of poly(DEAM) converted to acetate salt by addition of a slight excess of dilute acetic acid to give an exposure time of 0.1 second and excess moisture squeezed out to leave a calculated 0.2% based on weight of fiber of the polymeric amine on the surface of the wet tow. The tows are dried at 130° C. to <2% water. Approximately 4-gram samples selected randomly along the length of the tow are hand-carded and folded into pads for dyeing rate evaluations. The dye bath and general procedure are the same as used in Example 1, except that the dyeing is carried out at the boil, the dye being CI Basic Red 18. The dye bath is analyzed spectrophotometrically as each dyeing proceeds and the rate of disappearance of dye from the bath determined by reference to a calibration curve previously prepared. The percentage variation around the average dyeing rate (as an average of 10 runs) is calculated for each replicated set of experiments taking the 6.3% variation of the dyeings with no retarder as 100. Table 4 summarizes results in terms of the coefficient of dye rate variation (CV) and as percentage of standard (no retarder combined).

TABLE 4

| Retarder application | CV | Percent of— CV of standard |
|---|---|---|
| None (standard) | 6.3 | 100 |
| DuPont Retarder LAN (trimethyl hexadecyl ammonium bromide) (7.9% spun in) | 5.8 | 92 |
| Avitex JRM (trimethyl octadecyl ammonium chloride) (4.2% spun in) | 3.4 | 54 |
| Triton X-400 (dimethyl benzyl octadecyl ammonium chloride) (9% spun in) | 3.1 | 49 |
| Hyamine 2389 (trimethyl p-dodecyl-benzyl ammonium chloride) (2.5% spun in) | 6.9 | 110 |
| Topical application of poly(dimethyl aminoethyl methacrylate) acetate | 1.8 | 28.5 |

From this experiment, it is seen that topical application of a polyamine acetate in accordance with this invention gives more uniform retardation than does a commercial cationic retarder spun in during fiber manufacture.

EXAMPLE 5

Bicomponent acrylic fiber as described in Example 2 is employed in a comparison of poly(DEAM) acetate with retarders made by compolymerizing diethylaminoethyl methacrylate with acrylic acid or with methyl methacrylate and forming the acetate salts thereof to establish whether control of effectiveness in retarding of dyeing with CI Basic Violet 16 can be achieved by this dilution of the pure amine polymer.

In each experiment, 100 mg. of fiber is treated with a retarder solution as described in Example 2 except the solution contains 400% sodium sulfate in place of sodium chloride and 20% acetic acid plus sufficient sodium hydroxide to bring the pH of bath to 5.0, and treatment is at a temperature of 50° C. instead of at the boil. After treatment with retarder solution, the fiber is removed from the bath, 5 mg. CI Basic Violet 16 dye added (as a 0.05% solution), the bath heated to the boil, the fiber returned, and boiling continued for an additional 10 minutes. The fiber is removed, rinsed, and dried. Dye-on-fiber is determined as described in Example 2. Table 5 summarizes results.

TABLE 5

| Retarder | Dyeability (mm. dye/kg.) |
|---|---|
| None | 29.9, 32.5 |
| poly-DEAM acetate | 11.6 |
| Poly-DEAM/acrylic acid, 50/50, acetate | 23.9 |
| poly-DEAM/methyl methacrylate, 40/60 acetate | 17.0 |

In general, it is not necessary to remove from the acrylic fiber the small amount of poly(secondary amine) or poly(tertiary amine) required for effective cationic dyeing retardation. These retarders applied as hereinbefore discussed, appear to have no significant deleterious effect on aesthetics of fabrics knitted from fibers with the retarder in the surface nor do they significantly impair pick-up of fabric softener. If however, removal is desired, a highly alkaline scour is effective.

Application of some textile finishes before application of the retarder makes the filament surface more difficult to wet uniformly and is, therefore, less desirable than application of textile finishes subsequently. Filaments containing finish or those which have previously been dried may successfully be treated with the retarders of this invention, however, by use of an adequate wetting agent in the polyamine solution and use of somewhat longer exposure time and higher temperatures such as between 70–100° C. In some cases, application of poly(DEAM) after application of a typical textile finish may require a re-application of finish for improved finish effectiveness.

It has been found, in an alternative utility of this invention, that judicious limitation of the exposure of fiber to the dye bath will permit the development of deliberate dye variations (tone-on-tone effects) starting with a single species of fiber. Yarns of fibers previously coated with a poly(tertiary amine) or a poly(secondary amine) of this invention will dye levelly in the early stages to a lighter shade than uncoated yarn of the same fiber. Completion of the dyeing cycle in the presence of excess dye will minimize the difference in depth, however, the major distinction which remains being a more level dyeing on the retarder-treated yarns.

The preceding representative examples may be varied within the scope of the present total specification disclosure, as understood and practiced by one skilled in an art, to achieve essentially the same results.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. An anionically-modified acrylic fiber having on the surface thereof between about 0.01 to 2 percent by weight, based on the weight of fiber, of at least one polyamine or a protonated salt thereof, said polyamine having at least 70% of its recurring units selected from the class consisting of:

(a) 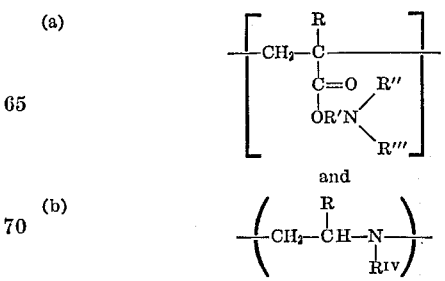

and (b)

wherein R, individually, is hydrogen or methyl, R' is alkylene of 1-4 carbon atoms, R" and R''', individually, are methyl or ethyl, and $R^{IV}$ is methyl, hydrogen or a mixture of hydrogen and units of

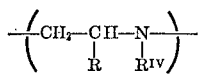

and wherein said polyamine has an inherent viscosity of between 0.05 and 2.0 in acetone at 25° C., and any remaining recurring units comprise hydrolyzed units of Formula a.

2. The fiber of claim 1 wherein the coating is a protonated salt of poly(diethylaminoethyl methacrylate) or mehylated poly(ethylenimine).

3. The fiber of claim 1 wherein the fiber is a bicomponent fiber.

4. Process for treating an anionically-modified acrylic polymer to retard dyeability, which comprises subjecting said fiber to an aqueous solution of a polyamine or a protonated salt thereof, said polyamine having at least 70% of its recurring units selected from the class consisting of:

(a)

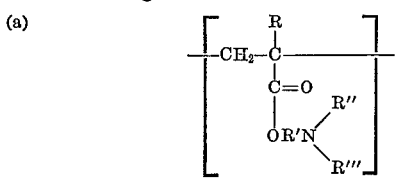

and (b)

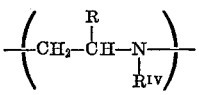

wherein R, individually, is hydrogen or methyl, R' is alkylene of 1–4 carbon atoms, R'' and R''', individually, are methyl or ethyl, and $R^{IV}$ is methyl, hydrogen or a mixture of hydrogen and the units of

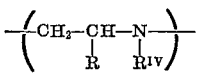

and wherein said polyamine has an inherent viscosity of between 0.05 and 2.0 in acetone at 25° C., and any remaining recurring units comprise hydrolyzed units of Formula a until pick-up of polyamine or protonated salt thereof on the fiber is between about 0.01 to 2% based on weight of fiber.

5. The process of claim 4 wherein the polyamine or protonated salt thereof is a protonated salt of poly(diethylaminoethyl methacrylate) or methylated poly(ethylenimine).

6. In the process of dyeing an anionically-modified acrylic fiber by immersing said fiber in an acidic cationic dye bath, the improvement consisting essentially of providing in said bath an amount of a protonated salt of a polyamine, said polyamine having at least 70% of its recurring units selected from the class consisting of:

(a)

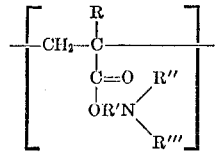

and (b)

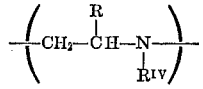

wherein R, individually, is hydrogen or methyl, R' is alkylene of 1–4 carbon atoms, and R'' and R''', individually, are methyl or ethyl, and $R^{IV}$ is methyl, hydrogen or a mixture of hydrogen and units of

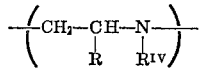

and wherein said polyamine has an inherent viscosity of between 0.05 and 2.0 in acetone at 25° C., and any remaining recurring units comprise hydrolyzed units of Formula a.

References Cited
UNITED STATES PATENTS

| | | | |
|---|---|---|---|
| 2,261,294 | 11/1941 | Schlack | 8—115.5 |
| 3,170,901 | 2/1965 | Melamed et al. | 26—89.7 |
| 2,891,835 | 6/1959 | Matter et al. | 8—172 |
| 2,963,339 | 12/1960 | Keller | 8—87 |
| 2,986,444 | 5/1961 | Rokohl et al. | 8—84 |
| 3,104,933 | 9/1963 | Mendelsohn et al. | 8—85 |
| 3,355,243 | 11/1967 | Bindler et al. | 8—172 |

FOREIGN PATENTS

| | | | |
|---|---|---|---|
| 898,311 | 6/1962 | Great Britain | 8—172 |
| 1,107,819 | 3/1968 | Great Britain | 8—172 |

MAYER WEINBLATT, Primary Examiner

T. J. HERBERT, Jr., Assistant Examiner

U.S. Cl. X.R.

8—177 AB